US009398555B2

(12) United States Patent
Watfa et al.

(10) Patent No.: US 9,398,555 B2
(45) Date of Patent: Jul. 19, 2016

(54) METHOD AND APPARATUS FOR USING CONTROL PLANE TO TRANSMIT AND RECEIVE DATA

(75) Inventors: Mahmoud Watfa, Saint Leonard (CA); Ulises Olvera-Hernandez, Kirkland (CA); Pascal M. Adjakple, Great Neck, NY (US); Kai Liu, S. Huntington, NY (US); Peter S. Wang, E. Setauket, NY (US); Saad Ahmad, Montreal (CA); Behrouz Aghili, Commack, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 191 days.

(21) Appl. No.: 13/464,132

(22) Filed: May 4, 2012

(65) Prior Publication Data
US 2012/0294236 A1     Nov. 22, 2012

Related U.S. Application Data

(60) Provisional application No. 61/483,385, filed on May 6, 2011.

(51) Int. Cl.
*H04W 60/04* (2009.01)
*H04W 84/04* (2009.01)
(Continued)

(52) U.S. Cl.
CPC ............ *H04W 60/04* (2013.01); *H04W 76/022* (2013.01); *H04W 76/046* (2013.01); *H04W 84/042* (2013.01)

(58) Field of Classification Search
CPC ....... H04W 80/04; H04W 8/26; H04W 60/04; H04W 72/04; H04W 72/0446; H04W 76/02; H04W 76/04; H04W 76/022; H04W 76/046; H04W 84/042; H04L 12/56; H04L 2012/56; H04L 29/0653; H04L 29/06095; H04L 49/3009; H04L 49/309; H04L 45/74
USPC ............... 370/349, 389, 392, 329, 341, 395.2
See application file for complete search history.

(56) References Cited

U.S. PATENT DOCUMENTS

| 2003/0204617 | A1* | 10/2003 | Buchsbaum et al. ......... 709/236 |
| 2007/0086356 | A1* | 4/2007  | Modena et al. ............... 370/252 |

(Continued)

FOREIGN PATENT DOCUMENTS

WO     2010/033398     3/2010

OTHER PUBLICATIONS

Alcatel-Lucent Shanghai Bell et al., "Online Small Data Transmission," 3GPP TSG SA WG2 Meeting #78, TD S2-101204 (Feb. 22-26, 2010).

(Continued)

*Primary Examiner* — Paul H Masur
*Assistant Examiner* — Kabir Jahangir
(74) *Attorney, Agent, or Firm* — Volpe and Koenig, P.C.

(57) ABSTRACT

Methods and apparatus are described for transmitting and receiving data by a wireless transmit/receive unit (WTRU) over the control plane. The methods may receive data without the use of an Internet Protocol (IP) address. In an example method, a WTRU may enter an evolved packet system (EPS) mobility management (EMM)-registered control plane only (CPO) state after receiving an attach accepted message for CPO operation, and enter an EMM-deregistered state after receiving a detach message, a tracking area update (TAU) reject message or an attach reject message. In another method, a WTRU may switch between operational modes that use an IP address and a user plane to transmit and receive data, and the CPO mode.

5 Claims, 4 Drawing Sheets

(51) Int. Cl.
*H04W 76/02* (2009.01)
*H04W 76/04* (2009.01)

(56) References Cited

U.S. PATENT DOCUMENTS

| | | | | |
|---|---|---|---|---|
| 2007/0232306 | A1* | 10/2007 | Johannesson et al. | 455/435.2 |
| 2008/0049621 | A1* | 2/2008 | McGuire et al. | 370/236.2 |
| 2008/0175232 | A1* | 7/2008 | Tsai et al. | 370/355 |
| 2009/0034476 | A1* | 2/2009 | Wang et al. | 370/331 |
| 2009/0111458 | A1* | 4/2009 | Fox et al. | 455/422.1 |
| 2009/0122727 | A1* | 5/2009 | Gan et al. | 370/259 |
| 2011/0007671 | A1* | 1/2011 | Yu | 370/255 |
| 2012/0040626 | A1* | 2/2012 | Chen et al. | 455/69 |
| 2012/0087279 | A1* | 4/2012 | Rinne et al. | 370/254 |
| 2012/0220330 | A1* | 8/2012 | Goldner et al. | 455/517 |
| 2012/0281566 | A1* | 11/2012 | Pelletier et al. | 370/252 |
| 2012/0307757 | A1* | 12/2012 | Edler Von Elbwart et al. | 370/329 |
| 2013/0100895 | A1* | 4/2013 | Aghili et al. | 370/329 |

OTHER PUBLICATIONS

Nokia Corporation et al., "Pseudo-CR on EMM message to contain no more than one ESM message," 3GPP TSG CT WG1 Meeting #55bis, C1-084492 (Oct. 6-10, 2008).

Third Generation Partnership Project, "Technical Specification Group Core Network; Mobile radio interface layer 3 specification; Core Network Protocols; Stage 3 (Release 1999)," 3GPP TS 24.008 V3.20.0 (Dec. 2005).

Third Generation Partnership Project, "Technical Specification Group Core Network and Terminals; Mobile radio interface Layer 3 specification; Core network protocols; Stage 3 (Release 4)," 3GPP TS 24.008 V4.17.0 (Sep. 2007).

Third Generation Partnership Project, "Technical Specification Group Core Network and Terminals; Mobile radio interface Layer 3 specification; Core network protocols; Stage 3 (Release 5)," 3GPP TS 24.008 V5.16.0 (Jun. 2006).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 v8.13.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 v8.16.0 (Dec. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 v9.10.0 (Mar. 2012).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 v10.5.0 (Mar. 2012).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 v9.6.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 v10.1.0 (Mar. 2011).

Third Generation Partnership Project, "Technical Specification Group Core Network and Terminals; Mobile radio interface Layer 3 specification; Core network protocols; Stage 3 (Release 6)," 3GPP TS 24.008 V6.20.0 (Mar. 2010).

Third Generation Partnership Project, "Technical Specification Group Core Network and Terminals; Mobile radio interface Layer 3 specification; Core network protocols; Stage 3 (Release 7)," 3GPP TS 24.008 V7.15.0 (Mar. 2010).

Third Generation Partnership Project, "Technical Specification Group Core Network and Terminals; Mobile radio interface Layer 3 specification; Core network protocols; Stage 3 (Release 8)," 3GPP TS 24.008 V8.13.0 (Mar. 2011).

Third Generation Partnership Project, "Technical Specification Group Core Network and Terminals; Mobile radio interface Layer 3 specification; Core network protocols; Stage 3 (Release 9)," 3GPP TS 24.008 V9.10.0 (Mar. 2012).

Third Generation Partnership Project, "Technical Specification Group Core Network and Terminals; Mobile radio interface Layer 3 specification; Core network protocols; Stage 3 (Release 11)," 3GPP TS 24.008 V11.2.1 (Mar. 2012).

Third Generation Partnership Project, "Technical Specification Group Core Network and Terminals; Mobile radio interface Layer 3 specification; Core network protocols; Stage 3 (Release 10)," 3GPP TS 24.008 V10.2.0 (Mar. 2011).

Third Generation Partnership Project, "Technical Specification Group Core Network and Terminals; Mobile radio interface Layer 3 specification; Core network protocols; Stage 3 (Release 10)," 3GPP TS 24.008 V10.6.1 (Mar. 2012).

Third Generation Partnership Project, "Technical Specification Group Core Network and Terminals; Non-Access-Stratum (NAS) protocol for Evolved Packet System (EPS); Stage 3 (Release 8)," 3GPP TS 24.301 V8.9.0 (Mar. 2011).

Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.9.0 (Mar. 2012).

Third Generation Partnership Project, "Technical Specification Group Core Network and Terminals; Non-Access-Stratum (NAS) protocol for Evolved Packet System (EPS); Stage 3 (Release 11)," 3GPP TS 24.301 V11.2.1 (Mar. 2012).

Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.6.0 (Mar. 2011).

Third Generation Partnership Project, "Technical Specification Group Core Network and Terminals; Mobile radio interface Layer 3 specification; Core network protocols; Stage 3 (Release 8)," 3GPP TS 24.008 V8.16.0 (Mar. 2012).

Third Generation Partnership Project, "Technical Specification Group Core Network and Terminals; Non-Access-Stratum (NAS) protocol for Evolved Packet System (EPS); Stage 3(Release 8)," 3GPP TS 24.301 V8.10.0 (Jun. 2011).

Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.6.1 (Mar. 2012).

Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.2.0 (Mar. 2011).

Third Generation Partnership Project, "Technical Specification Group Core Network and Terminals; Mobile radio interface Layer 3 specification; Core network protocols; Stage 3 (Release 9)," 3GPP TS 24.008 V9.6.0 (Mar. 2011).

ZTE, "Offline Small Data Transmission," 3GPP TSG SA WG2 Meeting #79, TD S2-102244 (May 1-15, 2010).

Third Generation Partnership Project, "Technical Specification Group Core Network Terminals; Mobile radio interface Layer 3 specification; Core network protocols; Stage 3 (Release 4)," 3GPP TS 24.008 V4.17.0 (Sep. 2007).

* cited by examiner

METHOD AND APPARATUS FOR USING CONTROL PLANE TO TRANSMIT AND RECEIVE DATA

CROSS REFERENCE TO RELATED APPLICATIONS

This application claims the benefit of U.S. provisional application No. 61/483,385, filed May 6, 2011, the contents of which are hereby incorporated by reference herein.

FIELD OF THE INVENTION

This application is related to wireless communications.

BACKGROUND

There may be several cases in which many wireless transmit/receive units (WTRUs) need to transmit a small amount of data, or to transmit data within a small time frame. This may depend on the type of application that these WTRUs are running. Thus, in general, there is a trend for WTRUs or applications that require transmission of small amounts of data to transmit that data, via a control plane, simply because the control plane has enough space to carry the data. Thus the establishment of a user plane and associated resource reservations may not be needed.

Moreover, using an Internet protocol (IP) address for each WTRU or for a group of WTRUs may consume many IP addresses. For example, in IPv4, there may be a limit to the size of an available IP address pool, and the number of WTRUs may exceed the number of available IP addresses. In addition, if an IP address were to be assigned to each WTRU, a lot of signalling may be required. Also, corresponding user plane resources may need to be setup and reserved. Thus, it may be useful to send data by other methods other than those requiring IP addresses.

SUMMARY

Methods and apparatus are described for transmitting and receiving data by a wireless transmit/receive unit (WTRU) over the control plane. The methods may receive data without the use of an Internet Protocol (IP) address. In an example method, a WTRU may enter an evolved packet system (EPS) mobility management (EMM)-registered control plane only (CPO) state after receiving an attach accepted message for CPO operation, and enter an EMM-deregistered state after receiving a detach message, a tracking area update (TAU) reject message or an attach reject message. In another method, a WTRU may switch between operational modes that use an IP address and a user plane to transmit and receive data, and the CPO mode.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, an evolved Node-B (eNB), a site controller, an access point (AP), or any other type of interfacing device capable of operating in a wireless environment.

Figure 1A:
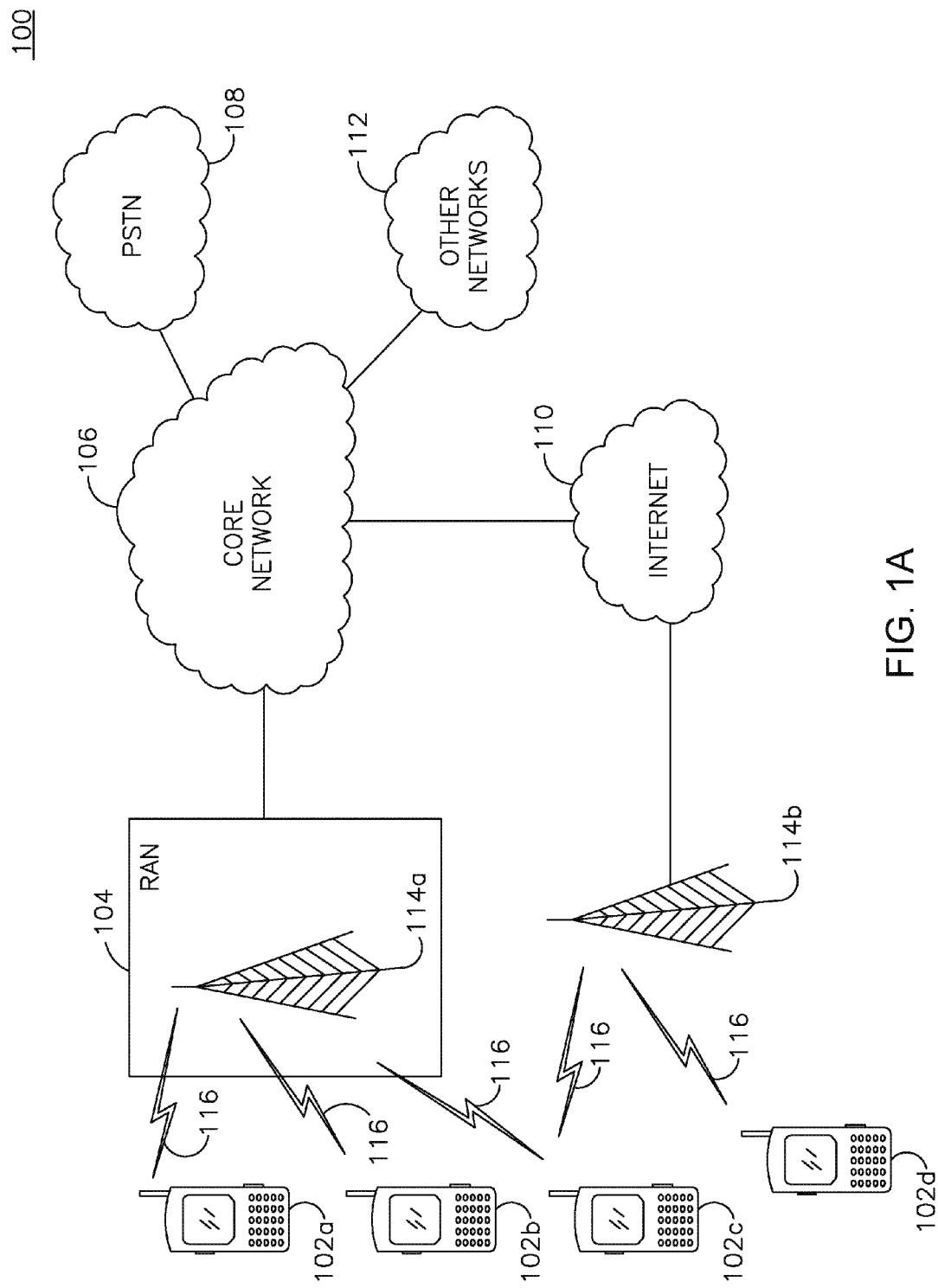
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed DL packet access (HSDPA) and/or high-speed UL packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1×, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
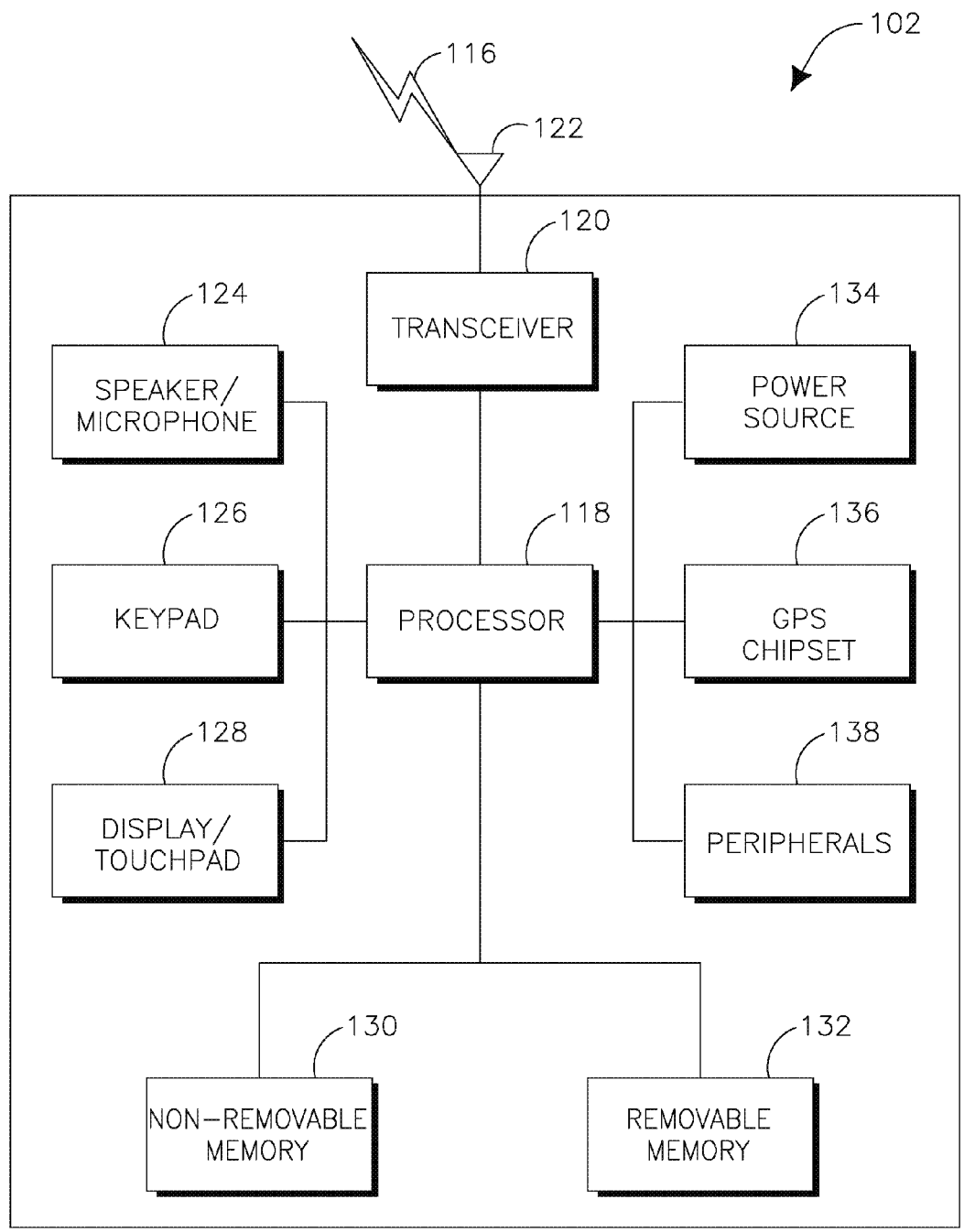
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
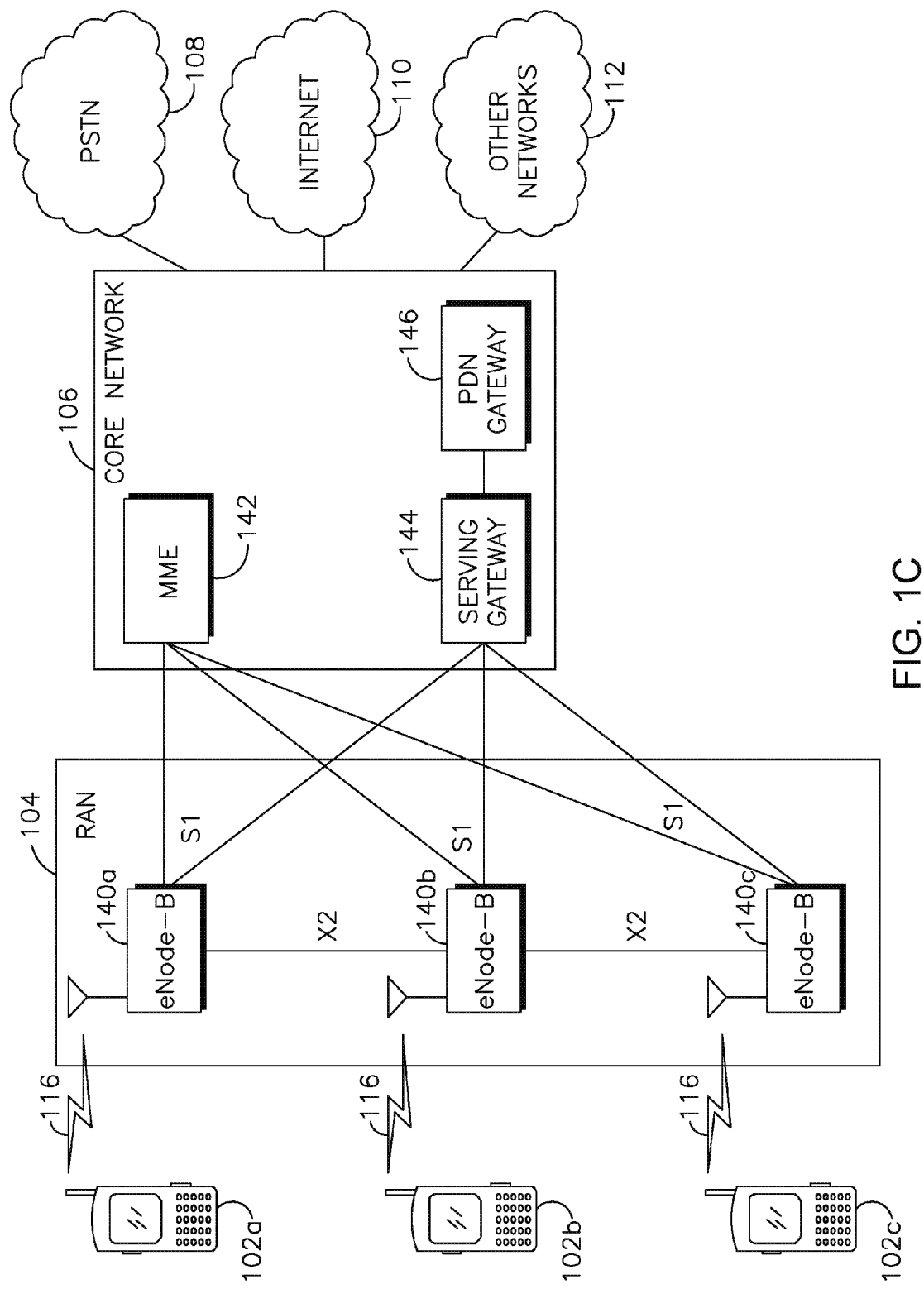
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the UL and/or DL, and the like. As shown in FIG. 1C, the eNBs 140a, 140b, 140c may communicate with one another over an X2 interface.

The core network 106 shown in FIG. 1C may include a mobility management entity (MME) 142, a serving gateway 144, and a packet data network (PDN) gateway (GW) 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when DL data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to other networks 112, which may include other wired or wireless networks that are owned and/or operated by other service providers.

Described herein are methods and apparatus for sending data over a control plane. For example, data may be sent via a non-access stratum (NAS) and may not need to use Internet Protocol (IP) addresses. In another example, a dummy IP address may be used to avoid exceeding the number of available IP addresses resulting from systematic assignment of real IP addresses to any device accessing the network. Various procedures, for example, an attach procedure, tracking area update (TAU) procedure, routing area update (RAU) procedure, service request procedure, handover (e.g., intra and inter system mobility), initial NAS message to transition the WTRU to connected mode and any impacts on access stratum (AS) layers, (i.e., radio resource control, packet data convergence protocol (PDCP) and the like), may have to be modified to implement a control plane only (CPO) operational mode. These procedures may be impacted by, or depend on, IP address allocation, and changes to these procedures may be needed due to the elimination of IP addressing or elimination of the establishment of the user plane.

For example, in LTE, every WTRU that attaches will be assigned an IP address, i.e., no WTRU may be attached in LTE without having an IP address. Thus, if data is sent over the control plane of LTE and IP addresses are not needed for some WTRUs, then changes may be required to support the registration and functioning of such WTRUs without an IP address. In another example, in the attach procedure, a WTRU that establishes a packet data network (PDN) connection is assigned an IP address. Thus, if a WTRU were to use control plane only (CPO) in LTE, the attach procedure may need to be modified to eliminate the PDN connection aspect from it. This may also be seen in the service request (SR) procedure, which is used to transition the WTRU from idle mode to connected mode. In the SR procedure, there may be radio bearers setup for all evolved packet system (EPS) bearers that the WTRU has active in the NAS, (the default bearer and possibly a dedicated bearer). If no bearers are setup, then the WTRU may consider the procedure as unsuccessful, and the WTRU may have to re-attach to the system. If the WTRU uses CPO, then the execution of the SR procedure from both the network and the WTRU side may have to be modified to eliminate the IP address allocation in LTE.

As described in the methods herein, a WTRU may operate in LTE under a normal service mode without necessarily having an IP address and use CPO to send or receive data. This may be implemented for the lifetime of the WTRU's registration, or for a predetermined time period based on operator policies. Moreover, the methods and apparatus described herein may be applicable to LTE and 3G/GERAN, whenever applicable, or any other system with similar functionalities.

Described herein are modifications to the attach procedure. The WTRU may indicate its capability to use CPO, regardless of whether the WTRU actually requests the use of CPO. For example, this may be achieved by defining a new bit in the WTRU network capability information element (IE), or any other such capability IE that is sent to the network. In another example, it may be included in the WTRU properties IE by defining a new bit to indicate that the WTRU is capable of, or wants to, use the CPO. The indication of this capability may be provided even if the WTRU is configured to attach as per a current procedure, (i.e., the attach is not for CPO). In another example, the WTRU may indicate CPO capability and/or request use of CPO as per settings in the WTRU, (in the universal subscriber identity module (USIM)), or due to changes in the settings selected by the user. Furthermore, the WTRU may be configured to switch its registration between use of CPO and other types of attach procedures.

The network may also indicate to the WTRU its capability to support CPO. This may be performed via broadcast messages, in dedicated NAS or radio resource control (RRC) messages, or via an access network discovery and selection function (ANDSF). This may also provide the WTRU with policies as to when/where to request CPO or EPS attach.

A new attach type IE may be defined, for example, "attach for CPO" or "attach with no IP", which may indicate that the WTRU is requesting a registration to the network where no IP address is required and CPO may be used for communication. This may be performed in addition to the procedure described above. This type of attach may also be performed for a group of devices that may or may not be using common identifiers, e.g., international mobile subscriber identity (IMSI) or another identification.

When the WTRU requests an attach for CPO, the WTRU may not include any EPS session management (ESM) container in the attach type. Thus, the network may determine based on the attach type that no ESM container is included in the message and therefore doesn't consider this as an abnormal or erroneous attach request. Alternatively, the WTRU may include an ESM container even if the attach type indicates an attach for CPO. The MME may then discard the ESM container if the attach type indicates CPO. Furthermore, the WTRU may keep the ESM container empty without filling up the fields of the piggybacked message. Alternatively, the WTRU may send the attach message with an ESM container piggybacking a PDN connectivity request message. However the WTRU sets the PDN type to a new value such that it indicates that no IP address allocation is necessary. As such, the MME may forward the message as per current procedures to the serving gateway (SGW)/PDN GW, which do not assign an IP address. This, however, needs to be signaled to the MME by the SGW or the PDN GW.

The MME may verify the contents of the ESM container/PDN connectivity request message so that it may determine whether or not the WTRU is requesting an IP address or CPO. The WTRU may also request CPO by setting the access point name (APN) IE to a known value. Alternatively, the value indicated by the home subscriber server (HSS) for the WTRU's allowed/default APN may be such that the use of CPO may be allowed for this WTRU.

The network may accept the attach procedure for a specific attach type that is different from what the WTRU has requested. For example, if the WTRU requests an attach type indicating "EPS attach," and the WTRU also signals that it supports use of CPO, the network may accept the attach for CPO. Thus, the network may send the attach accept with an EPS attach result IE set to, for example, "attach for CPO".

The network may also include an EPS mobility management (EMM) cause to explain why the WTRU was not granted the current EPS attach. Based on the EMM cause, the WTRU may stop requesting an attach type for EPS services. Furthermore, based on WTRU settings or policies or user intervention, e.g., the WTRU may display/present to the user/ upper layers, that the attach type is for CPO and the user/upper layers may decide to accept the current attach or reject it. If it is rejected, the WTRU may either detach and specify a cause code indication which requires having an IP address or EPS attach type, or the WTRU may send an attach reject message with such an EMM cause. If the WTRU/user/upper layers accept the attach for CPO, the WTRU may send a new or existing NAS message to confirm the attach for CPO.

The network may also start a timer for the WTRU during which it is expected to receive a response to accept/reject the attach for CPO. If the timer expires without receiving a response from the WTRU, the network may either consider the WTRU attached for CPO or detached, based on operator policy. If the WTRU sent an attach request message with attach type set to EPS attach, (i.e., will acquire an IP address and therefore the message will also include an ESM container that carries the PDN connectivity request message), the network may discard the ESM container and avoid contacting the SGW/PDN GW for establishment of a PDN context or IP address, and the associated EPS bearer context. If the WTRU also initiates the activation of a dedicated EPS bearer context before the attach procedure is completed, the network may also discard the message, and respond only to the attach request message with a result indicating CPO if the network decides that this WTRU is only allowed to use the CPO.

In addition to requesting a registration for control plane communication only, a WTRU may also indicate the specific method of control plane messaging it supports. For example, the methods may include short message service (SMS) over SGs, SMS via MME, (in the case where the MME processes or forwards the SMS via another interface other than the SGs interface), and the like. This may be achieved by a form of bitmap, where each bit represents a particular control plane message.

The network may also indicate, such as when accepting an attach for CPO, if a user plane may be initiated for emergency services, (i.e., if the WTRU is allowed to exceptionally initiate a PDN connection for emergency bearer services when required). Alternatively, the WTRU may only establish a PDN connection for emergency bearer services even if no such indication is received.

The EMM and the ESM layers in both the WTRU and MME may interact when requesting the use of CPO in LTE. For example, the ESM upon attach may provide the ESM container to the EMM entity. The latter may inform the ESM that the attach type will be performed for CPO, (based on settings/policies/network configurations), or the EMM may indicate to the ESM, after an attach procedure has been performed, that the attach was accepted for CPO. Thus, the ESM may not consider this as an erroneous procedure. The ESM entity in the WTRU may also keep a flag that indicates the WTRU is using CPO and therefore is not allocated an IP address.

The HSS, (or any other entity of similar functionality in other systems), may hold information about the WTRU's allowed services such that, when the MME requests subscription information during attach, the HSS may indicate to the MME that CPO is allowed for this WTRU. Alternatively, the HSS may provide all of the subscription information regarding CPO and any associated conditions. Thus, the MME may choose to only allow the use of CPO for this particular WTRU based on the received subscription information from the HSS and the network policies.

The information may indicate why the MME accepts an attach for CPO even if the WTRU requests an attach with type set to EPS attach. For roaming WTRUs, the visited public land mobile network (VPLMN) may contact the home public land mobile network (HPLMN) to fetch information about whether a WTRU in question is allowed to have full services in the network or should only use CPO as a means to exchange data. If such information is not available from the HPLMN, then the VPLMN may choose as per network policies, whether to allow the WTRU to use full EPS services or CPO. The WTRU may also indicate to the network the WTRU's last mode of operation. For example, if the WTRU used CPO in its last prior registration.

If the WTRU is configured to either use EPS services or CPO, then the WTRU may perform PLMN reselection if the WTRU is informed that a given PLMN does not support its needs or preferred mode of operation.

The network may indicate a time during which the WTRU remains attached for CPO. This may be included in any NAS or RRC messages, (for example an attach accept message), and the WTRU may locally detach or initiate the detach procedure when the timer expires. New EMM cause values or IEs may be defined that are included in a detach request message. For example, these EMM cause values or IEs may be used by network to indicate that a re-attach is required for a WTRU and that the registration may be CPO.

Alternate methods for implementing or using CPO may introduce minimal changes. In general, the procedures described herein below discuss the impacts from using a dummy IP address and the solutions to dealing with these impacts. Moreover, the triggers for dummy IP address allocation are defined, as well as the handling of possible back and forth switching between using only a dummy IP address, (user plane data on control plane for example), versus using a dummy IP address and real IP address, versus using only a real IP address. The possible back and forth switching between the transfer of user data over the control plane and the transfer of user data over both control plane and user plane or over user plane only are analyzed.

In an example method, a WTRU may include an ESM container and also indicate that the attach is for CPO in either the attach type, the PDN type or both. The network may process the messages and assign a dummy IP address to the WTRU. The value of this dummy IP address may be defined and known to both the WTRU and the network. Alternatively, the network may provide an IP address and indicate that the IP address is a dummy address.

In another example method, the attach result indicated by the MME, (EMM entity in the network), may indicate that any assigned IP address is not a real IP address, i.e., it is a dummy address.

In another example method, the WTRU may always be provided with a real and usable IP address that may be used when certain conditions or triggers are met. These conditions/triggers may be known and preconfigured in the WTRU/network, or provided to the WTRU by the network or via Open Mobile Alliance (OMA) device management (DM) or over-the-air (OTA) messages. For example, one such trigger may be the existence of a large amount of data to be sent such that it is more efficient to use the IP layer/user plane to send/receive the data. Another trigger may be an indication provided by the network to the WTRU. For example, upon paging, the network may indicate to the WTRU that the user plane should be used for mobile terminated (MT) data transfer.

The control (policy) of the accessibility or support of a dummy IP address connectivity, no IP address connectivity or the like may be based on a per access point name (APN) basis, per closed subscriber group (CSG) basis, or any combination thereof. Moreover, each of the attributes for the control of the dummy IP address connectivity or no IP address connectivity may be defined with the flag "allowed", "not allowed", "conditionally allowed" or CPO. Such control attributes may be defined in the user subscription profile in HSS. The dummy IP address connectivity, no IP address connectivity or the like may also be configured based on traffic type. For example, a keep-alive-message may be associated with a specific traffic flow template (TFT), which may be by default mapped to control plane bearers.

In another example method, the dummy IP address may be allocated by the PGW, similar to how a real IP address is allocated but with or without the establishment of the user plane bearer resources, (PGW<->SGW tunnels, SGW<->eNB/HeNB-GW or HeNB tunnels, and RAN resources).

In another example method, the dummy IP address may be allocated by the MME or the SGW with or without the establishment of the user plane bearer resources.

The two example methods described herein above apply equally to other PDN connectivity procedures such as service request procedures, dedicated bearer activation procedures, bearer modification procedures and PDN connectivity request procedures.

In another example method, a dummy IP address assignment may be temporary, (i.e., the WTRU may use a dummy IP address during a part of the lifetime of the connection). Alternatively, the WTRU may be allocated a real IP address during part of the lifetime of the connection.

In another example method, a dummy IP address may be allocated at the establishment of the PDN connection or at any time during the lifetime of the connection. The WTRU may switch back and forth between data transmissions over the control plane and data transmissions over the user plane. Moreover, data transmissions over the control plane and data transmissions over the user plane may take place concurrently. In this case, the WTRU may have at the same time a dummy IP together with at least one real IP address, or only at least one real IP address.

An assignment of a dummy IP address may also indicate that the WTRU is registered to the network and has a connection for signaling (NAS signaling) purposes but cannot exchange user data with the network.

Figure 2:
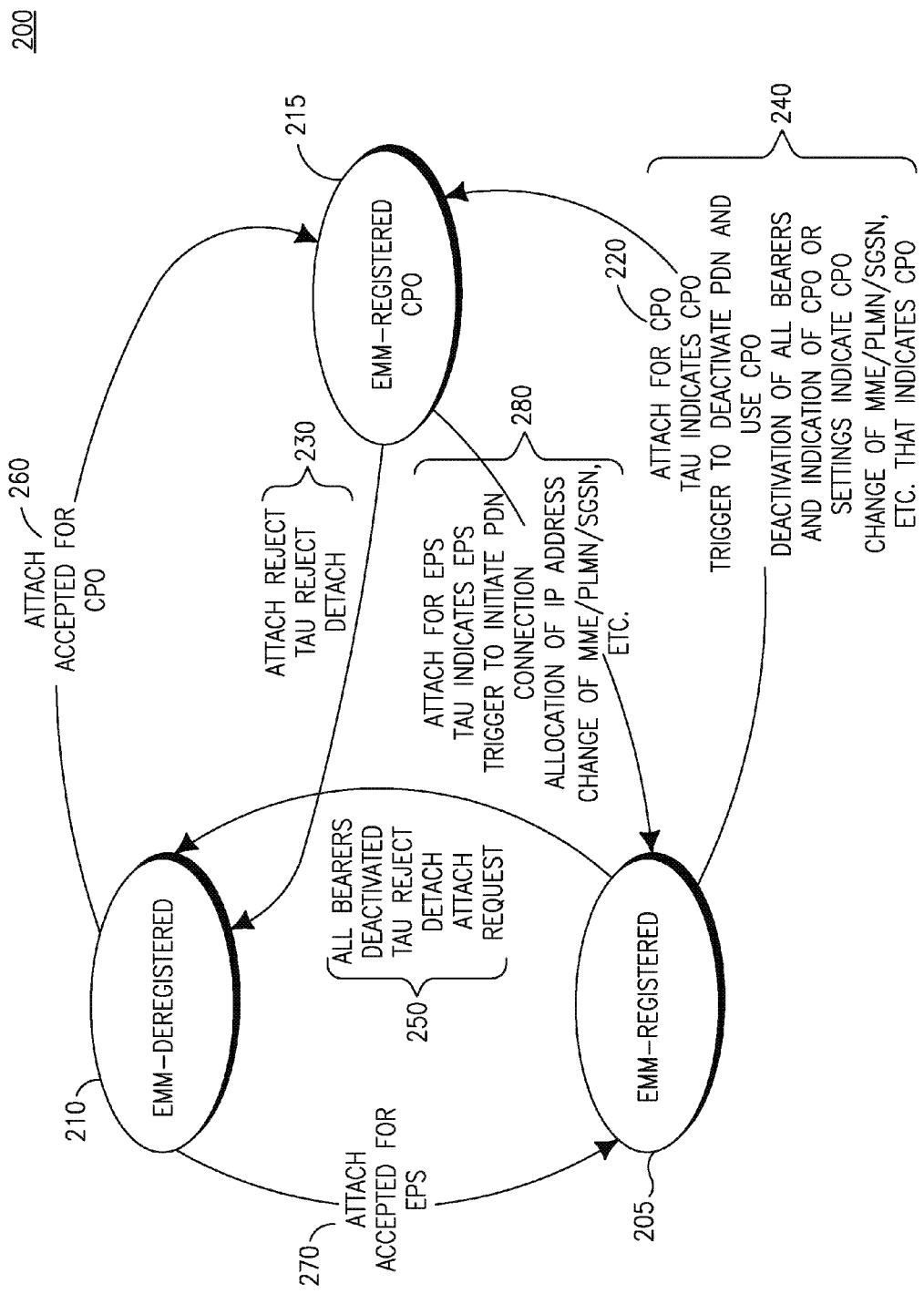
FIG. 2 shows transitions between EPS mobility management (EMM) control plane only (CPO) states.

FIG. 2 is an example state diagram 200 of the WTRU that integrates the CPO capability and includes an EMM-Registered state 205, an EMM-Deregistered state 210 and an EMM-Registered.CPO 215 state. The EMM-Registered.CPO 215 state may be defined for a WTRU that is attached without an active EPS bearer and/or IP address and may send data over the LTE control plane without the EPS bearer/IP address. FIG. 2 also illustrates example triggers and/or indicators to transition from one state to another. Details of some of these example triggers and/or indicators may be described herein. Although the state diagram 200 is explained by way of example from the WTRU perspective, the state diagram also applies to the WTRU context maintained in the network.

The WTRU may use a special attach type 220 to attach for CPO without being assigned any dedicated bearers. A WTRU that is attached for CPO may enter an EMM-Registered.CPO state 215. A WTRU in the EMM-Registered.CPO state 215 may return to the EMM-Deregistered state 210 in response to a detach message, a TAU reject message or an attach reject message 230, where the messages are sent by the network. The WTRU may transition to an EMM-Registered state 205 in response to a successful Attach procedure, a successful TAU procedure indicating EPS, a trigger to initiate a PDN connection from WTRU higher layer or the network, allocation of an IP address, or a change in MME/PLMN/SGSN/base station.

If the WTRU is in an EMM-Registered state 205, the WTRU may transition to an EMM-Registered.CPO state 215 in response to an attach for CPO message, a TAU procedure indicating CPO, a trigger to deactivate PDN and use CPO, deactivation of all bearers and an indication of CPO, settings indicating CPO, or a change in MME/PLMN/SGSN and the like that indicates CPO 240. The WTRU may transition to an EMM-Deregistered state 210 if all bearers are deactivated, or upon receipt of a TAU reject message, a detach message or an attach rejection 250.

If the WTRU is in an EMM-Deregistered state 210, the WTRU may transition to an EMM-Registered.CPO state 215 upon acceptance of an attach CPO request 260 and to an EMM-Registered state 205 upon acceptance of an attach request 270.

Described herein are modifications to the TAU or RAU procedures. New update types may be defined, for example, a periodic update for CPO, or normal update for CPO. The former may be used when the TAU is a periodic TAU. The latter may be used when the WTRU, for example, enters a new TA, MME or PLMN and/or recognizes a trigger to perform a TAU to request CPO, and the WTRU may have already been assigned an IP address. Corresponding update results may also be defined as illustrated herein. The TAU has an information element (IE) that is called "Update type". This IE may be set to periodic update. The response from the network, (TAU Accept), has an IE called "EPS update result" that informs the WTRU about the type of update for which the TAU Accept is being sent, (i.e., depending on the request and network decision). In view of this process, if the WTRU sends a TAU and an "Update type" equals CPO, then the expected response may have an update result equal to CPO. If the WTRU sends an "Update type" equal to normal, (i.e., IP address based), then the result may have an update result equal to CPO, (depending on network policy and WTRU subscription).

For inter-MME, (or inter-system core network (CN) nodes such as a serving GPRS support node (SGSN) to MME or vice versa), an indication/message is passed from an old MME to a new/target MME that the WTRU is registered for CPO. In general, the old MME may indicate whether the WTRU used CPO or an IP address for data transmission. The lack of an indication or EPS bearer information may be interpreted by the target MME that the WTRU used CPO.

Upon MME relocation, the new/target MME may decide to establish a PDN connection for the WTRU based on operator policy, even if the WTRU had CPO in the previous MME. The reverse may also occur. That is, even if the WTRU had a PDN connection, (IP address allocated), in the old MME, the new/target MME may decide to deactivate the PDN connection and make the WTRU use the CPO. In this case, the MME may also deactivate/release the resources in the other nodes, (for example, the SGW or PDN GW). Alternatively, the release of the resources may be done by or at the old/source MME.

If the WTRU changes its mode of operation, (due to manual setting changes or use intervention), to use the CPO, then this may be a trigger to perform a TAU and indicate the request for CPO. This may also be allowed if the WTRU wants to change its operation mode from CPO to the use of an IP address.

Described herein are modifications to the service request procedure. After sending a service request (SR) or an extended service request (ESR) message, the network does not setup any user plane bearers if the WTRU is attached for CPO. Thus, in order to interpret the procedure as successful by the WTRU, the network may reply with a service accept or any other NAS message that may indicate that the SR or ESR for CPO has been successful. Alternatively, the WTRU may treat the establishment of signaling radio bearers (SRBs) as the successful completion of the SR procedure. Alternatively, RRC messages may indicate the success of the procedure, for example, the RRCConnectionReconfiguration and the RRC may forward this indication to the NAS.

Described herein are modifications to the intra and inter system handover (HO) procedures. When the WTRU uses the control plane for small data transmissions, the WTRU may not have default EPS bearers established. This may conflict with the intra and inter system HO procedures that have a requirement for a data radio bearer (DRB).

For example, the evolved universal terrestrial radio access network (E-UTRAN) may initiate a RRC connection reconfiguration procedure to a WTRU in RRC_CONNECTED. The E-UTRAN currently applies the procedure by including the mobilityControlInfo only when AS-security has been activated, and SRB2 with at least one DRB are setup and not suspended. However, if the WTRU is configured for CPO, the intra LTE mobility procedure may be modified to support SRB only handovers.

In another example, in the handover to E-UTRAN case, the RAN may use another radio access technology (RAT) to initiate the handover to E-UTRA procedure, in accordance with the specifications applicable for the other RAT, by sending the RRCConnectionReconfiguration message via the radio access technology from which the inter-RAT handover is performed. The E-UTRAN applies the procedure to activate ciphering, possibly using a NULL algorithm, if not yet activated in the other RAT, and to establish SRB1, SRB2 and one or more DRBs, i.e., at least the DRB associated with the default EPS bearer is established. The E-UTRAN may further initiate the mobility from E-UTRA procedure to a WTRU in RRC_CONNECTED, possibly in response to a MeasurementReport message or in response to reception of a circuit switched (CS) fallback indication for the WTRU from the MME, by sending a MobilityFromEUTRACommand message. The E-UTRAN may initiate the procedure only when AS-security has been activated, and SRB2 with at least one DRB are setup and not suspended.

Also, during the handover procedure, the source base station may send a handover request to the target base station, (either directly in case of X2 handover or via MME in case of S1 handover procedure), and after this message is accepted by the target base station a path switch message may be sent to the MME by the target base station. This path switch message informs the MME that the WTRU has been moved to the target base station. These messages, (handover request and path switch request), contain some mandatory IEs to setup evolved RABs (E-RABs) and the corresponding GPRS tunneling protocol (GTP) tunnels for DRB, e.g., E-RAB ID, transport layer address, GTP tunnel end point identifier (TEID), and the like. These IEs are not required for the CPO handover procedure and may be addressed using the following methods: 1) the IEs may remain but are sent as blank IEs; 2) the IEs may be removed from these messages for the CPO handover case; 3) a special value may be assigned in these IEs indicating that this is a control plane handover; 4) new messages may be defined for the CPO handover scenario; 5) new may be defined which may only handover SRBs; or 6) a special indication may be sent in any of these messages to indicate that the handover is a CPO handover and that these IEs may be ignored. These procedures are applicable to inter-MME handovers and inter-RAT handovers.

During mobility procedures, (including inter-RAT mobility and inter-PLMN mobility), the "dummy IP based connectivity" or "no IP based connectivity" bearer handover may take into account the access control attribute to determine whether or not such service may be provided in the target cell. For example, the target cell or system might not allow the WTRU to have a dummy IP address based connectivity or no IP address-based connectivity. In such a case, an IP address may be allocated for an IP address-based connectivity in order for the handover to proceed. If the WTRU profile dictates CPO connectivity, then the handover procedure may fail and the network may detach the WTRU.

Described herein is a new initial NAS message. The following may be applicable to CPO and when the WTRU has an IP address, (or has a PDN connection). The new initial NAS message may be sent to transition the WTRU from idle to connected mode, i.e., the WTRU may use another message different from a service request message. For example, the message may be an uplink (UL) NAS TRANSPORT, GENERIC UL NAS TRANSPORT, or any other NAS message (EMM or ESM).

Described herein are methods for addressing the impacts of CPO on the RRC procedures. For the NO_IP use case, i.e., the CPO mode, one or more of the following RRC procedure modifications may be employed to address fulfill the needs. In an example method, a new cause or cause value may be specified by the WTRU to the network for indicating the purpose of a NO_IP connection establishment, establishing a new efficient control signaling set or relinquishing an existing IP address.

In another example, a new cause or cause value may be specified by the WTRU to the network for the purpose of reestablishing a connection with an IP address for the WTRU. In another example, a new cause or a cause value may be specified by the WTRU to the network for the purpose of indicating that a control plane only connection is to be established for the WTRU. The RRC messages affected by the above new parameter or new parameter values may include one or more of the following: 1) RRCConnectionRequest; 2) RRCConnectionSetupComplete; 3) RCConnectionReestablishmentRequest; 4) RRCConnectionReconfigurationComplete; or 5) a new RRC message from the WTRU to the network.

The methods described herein may apply in any combination and also apply to LTE, GERAN, UTRAN, or any other system. Moreover, even though some signaling/procedures are described in reference to LTE applications, they may also apply to equivalent signaling/procedures in other systems.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed is:

1. A wireless transmit/receive unit (WTRU) comprising:
   a transceiver, a memory and a processor configured to establish a packet data network (PDN) connection with a wireless network;
   the transceiver, the memory and the processor, on a condition that the WTRU has a small amount of data to transmit, further configured to transmit a radio resource control (RRC) connection request message including a corresponding indication for a control plane only connection; and
   the transceiver, the memory and the processor further configured to transmit the small amount of data over a control plane via a non-access stratum (NAS) message, wherein a user plane connection is not established with the wireless network and other user data is not exchanged with the wireless network.

2. The WTRU of claim 1 wherein the transceiver, the memory and the processor are configured to establish the PDN connection by establishing an IP address.

3. A method comprising:
   establishing, by a wireless transmit/receive unit (WTRU), a packet data network (PDN) connection with a wireless network;
   on a condition that the WTRU has a small amount of data to transmit, transmitting, by the WTRU, a radio resource control (RRC) connection request message including a corresponding indication for a control plane only connection; and
   transmitting, by the WTRU, the small amount of data over a control plane via a non-access stratum (NAS) message, wherein a user plane connection is not established with the wireless network and other user data is not exchanged with the wireless network.

4. The method of claim 3 wherein the establishing the PDN connection includes establishing an IP address.

5. An evolved NodeB (eNodeB) comprising:
   a transceiver, a memory and a processor configured to exchange messages with a wireless transmit receive unit (WTRU), wherein the exchanges messages establish a packet data network (PDN) connection with the WTRU;
   the transceiver, the memory and the processor further configured to receive a radio resource control (RRC) connection request message including a corresponding indication for a control plane only connection; and
   the transceiver, the memory and the processor further configured to receive a small amount of data over a control plane via a non-access stratum (NAS) message, wherein a user plane connection is not established with the WTRU and other user data is not exchanged with the WTRU.

* * * * *